United States Patent
Glandorf

(10) Patent No.: US 8,041,448 B2
(45) Date of Patent: Oct. 18, 2011

(54) MOUSE-BASED HAND WHEEL CONTROL FOR A MACHINE TOOL

(75) Inventor: Joseph D. Glandorf, Ann Arbor, MI (US)

(73) Assignee: Hurco Companies, Inc., Indianapolis, IN (US)

(*) Notice: Subject to any disclaimer, the term of this patent is extended or adjusted under 35 U.S.C. 154(b) by 693 days.

(21) Appl. No.: 12/115,946

(22) Filed: May 6, 2008

(65) Prior Publication Data

US 2009/0281664 A1 Nov. 12, 2009

(51) Int. Cl.
*G06F 19/00* (2011.01)
*G05B 15/00* (2006.01)

(52) U.S. Cl. ......... 700/180; 700/85; 345/184; 318/628

(58) Field of Classification Search .............. 700/85, 700/83, 180; 345/184, 156, 157, 163, 166; 318/628
See application file for complete search history.

(56) References Cited

U.S. PATENT DOCUMENTS

| | | | |
|---|---|---|---|
| 4,561,183 A | 12/1985 | Shores | |
| 4,652,805 A | 3/1987 | Kohn et al. | |
| 4,788,537 A | 11/1988 | Potiker | |
| 5,317,336 A | 5/1994 | Hall | |
| 5,404,152 A * | 4/1995 | Nagai | 345/157 |
| 5,473,345 A | 12/1995 | Dorst | |
| 5,682,319 A | 10/1997 | Boland et al. | |
| 5,793,354 A * | 8/1998 | Kaplan | 345/157 |
| 5,828,198 A | 10/1998 | Engelse et al. | |
| 5,838,305 A | 11/1998 | Bookstein | |
| 6,452,571 B1 | 9/2002 | Chung | |
| 6,757,714 B1 | 6/2004 | Hansen | |
| 7,185,014 B1 | 2/2007 | Hansen | |
| 7,437,211 B1 * | 10/2008 | Haas et al. | 700/188 |
| 2001/0051509 A1 * | 12/2001 | Mukai et al. | 455/90 |
| 2005/0231463 A1 * | 10/2005 | Yang | 345/156 |
| 2006/0292534 A1 | 12/2006 | Tomes | |
| 2007/0117680 A1 | 5/2007 | Neff et al. | |
| 2007/0242060 A1 * | 10/2007 | Cheah | 345/184 |
| 2008/0007519 A1 * | 1/2008 | Mellot et al. | 345/156 |

FOREIGN PATENT DOCUMENTS

| DE | 39 42 811 | 6/1991 |
|---|---|---|
| DE | 19945341 | 3/2001 |

OTHER PUBLICATIONS

Furkan A. Kanburoglu, et al. "A Test Setup for Evaluating Long-Term Measurement Characteristics of Optical Mouse Sensors", Journal of Automation, Mobile Robotics & Intelligent Systems, vol. 1, No. 2, Jun. 2007, pp. 71-75.

T. W. Ng: "The Optical Mouse as a Two-Dimensional Displacement Sensor," Elsevier B.V., Sensors and Actuators : Physical, vol. 107, No. 1, Jul. 24, 2003, pp. 21-25.

International Search Report for PCT/US2009/042551 issued by the European Patent Office on Jul. 22, 2009, 3 pages.

* cited by examiner

*Primary Examiner* — Albert Decady
*Assistant Examiner* — Steven Garland
(74) *Attorney, Agent, or Firm* — Baker & Daniels LLP

(57) ABSTRACT

A machine tool is controlled using a pointing device coupled to two rotatable hand wheels. The pointing device tracks movement of the two hand wheels and communicates the movement to a control system which controls a moveable element.

11 Claims, 5 Drawing Sheets

MOUSE-BASED HAND WHEEL CONTROL FOR A MACHINE TOOL

BACKGROUND

1. Field of the Invention

The present invention relates to machine tools. More particularly, the present invention relates to a device for controlling a hand wheel of a machine tool and to a method for using the same.

2. Description of the Related Art

Computer numerically controlled ("CNC") machine tools use various cutting tools, such as drills, end mills, reamers, and taps, to manufacture a workpiece into a final part. The cutting tools are held by a movable, rotating spindle under the control of a part program to selectively contact the workpiece and remove material from the workpiece. The result is a manufactured part having a desired shape.

The machine tool itself may be provided with a control system for automatically positioning the workpiece and the cutting tool. For example, the control system may include a computer software program for automatically operating the machine tool. Machine tools may also be provided with devices for manually positioning the workpiece and the cutting tool. For example, the machine tool may include a hand wheel. A user may rotate the hand wheel to indicate a desired motion, position, and/or velocity of the machine tool.

Currently, when a user manually positions the workpiece and/or the cutting tool using the hand wheel, the machine tool receives information from the hand wheel using an optical glass code system. The system includes a glass code wheel, an LED, and an optical detector. The glass code wheel has etched portions that block light from the LED from passing through to the optical detector and clear portions that permit light from the LED to pass through to the optical detector. The glass code wheel must be precisely machined and etched, and the optical detector must be precisely aligned with the glass code wheel. Additionally, the glass code system may require dedicated software to interpret signals from the optical detector.

SUMMARY

According to an embodiment of the present invention, a machine tool is provided having at least one movable element, a control system, a rotatable hand wheel, and a pointing device. The pointing device is coupled to the hand wheel. The pointing device is configured to track a movement of the hand wheel and communicate the movement to the control system. The control system is configured to control the at least one movable element based upon the movement of the hand wheel.

According to another embodiment of the present invention, a device is provided for manually operating a machine tool. The device includes a rotatable hand wheel and a pointing device. The pointing device is coupled to the hand wheel. The pointing device is configured to track and communicate a movement of the hand wheel.

According to yet another embodiment of the present invention, a method is provided for manually operating a machine tool. The method includes the steps of providing a hand wheel with a pointing device coupled to the hand wheel and rotating the hand wheel. The method further includes the steps of tracking a movement of the hand wheel with the pointing device, communicating the movement of the hand wheel to a control system, and positioning a movable element of the machine tool based upon the movement of the hand wheel.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
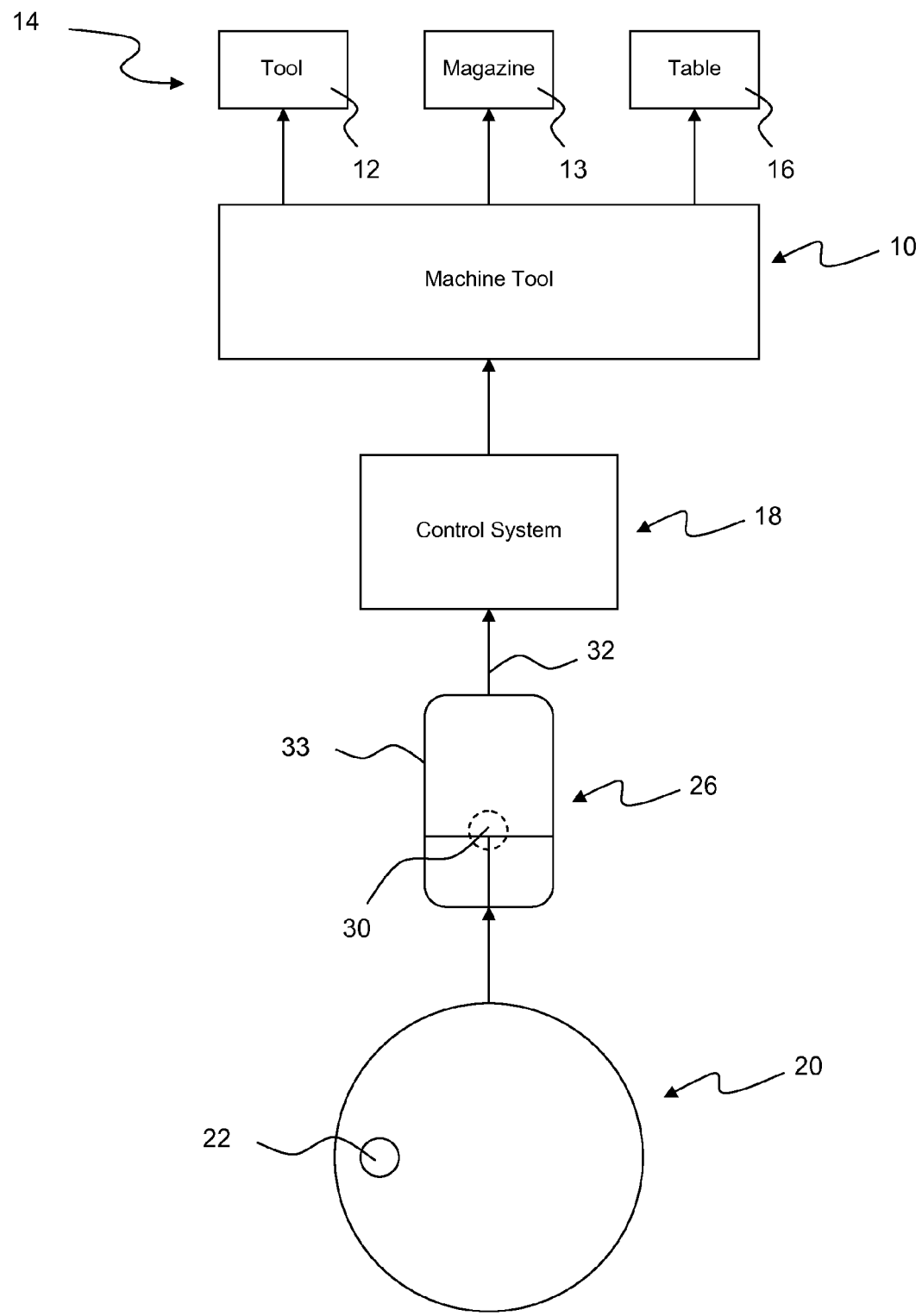
FIG. 1 is a schematic diagram illustrating a method of the present invention for using a pointing device to track movement of a hand wheel of a machine tool.

Referring to FIG. 1, machine tool 10 is provided for manufacturing a workpiece. Machine tool 10 may include, for example, a milling machine, a lathe, or a drilling machine. Machine tool 10 includes cutting tool 12 held by a movable, rotating spindle. In operation, cutting tool 12 of machine tool 10 selectively contacts the workpiece (not shown) under the direction of a part program and removes material from the workpiece, resulting in a manufactured part having a desired shape. For example, cutting tool 12 may be in the form of a drill bit, an end mill, a reamer, or a tap.

Referring still to FIG. 1, machine tool 10 includes at least one movable element 14. Movable element 14 may include, for example, cutting tool 12, tool magazine 13, and/or a workpiece positioning or handling mechanism such as workpiece table 16. As previously mentioned, cutting tool 12 contacts the workpiece to remove material from the workpiece. Tool magazine 13 is configured to store numerous cutting tools 12. Workpiece table 16 is configured to fix the workpiece in place and to move the workpiece relative to cutting tool 12. As movable element 14 changes position, the relative position between cutting tool 12 and the workpiece also changes. For example, cutting tool 12 may be raised and lowered (Z direction) relative to the workpiece and tool magazine 13 may be rotated. Similarly, workpiece table 16, and the workpiece attached thereto, may be moved side to side (X direction), moved back and forth (Y direction), and raised and lowered (Z direction) relative to cutting tool 12. Workpiece table 16 may also include a rotary table that rotates the workpiece relative to cutting tool 12.

Referring still to FIG. 1, machine tool 10 further includes control system 18. Control system 18 may be configured to receive user inputs, to execute a part program, and/or to control movement of movable element 14. Control system 18 may include a personal computer having a software program for operating machine tool 10 and for executing a part program, such as a computer numerically controlled (CNC) software program.

Figure 2:
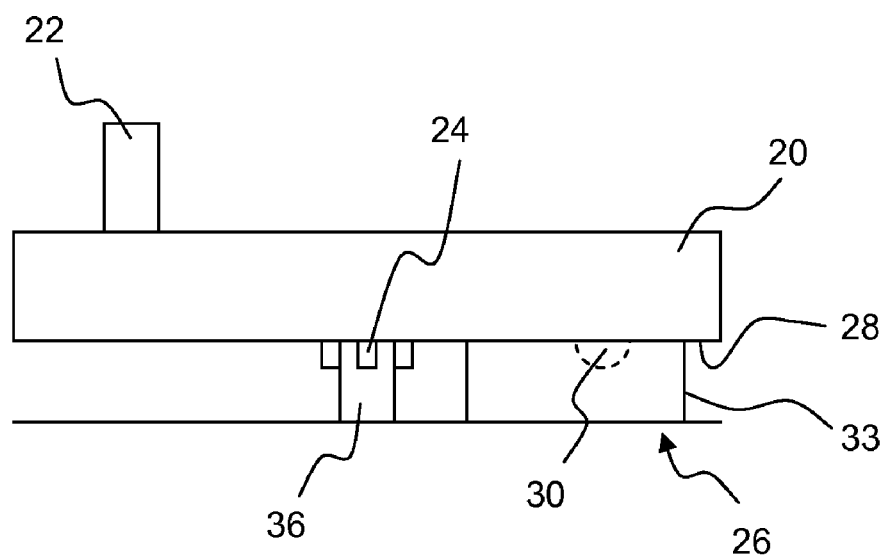
FIG. 2 is an elevational view of the pointing device coupled to the hand wheel according to an embodiment of the present invention.
Figure 3:
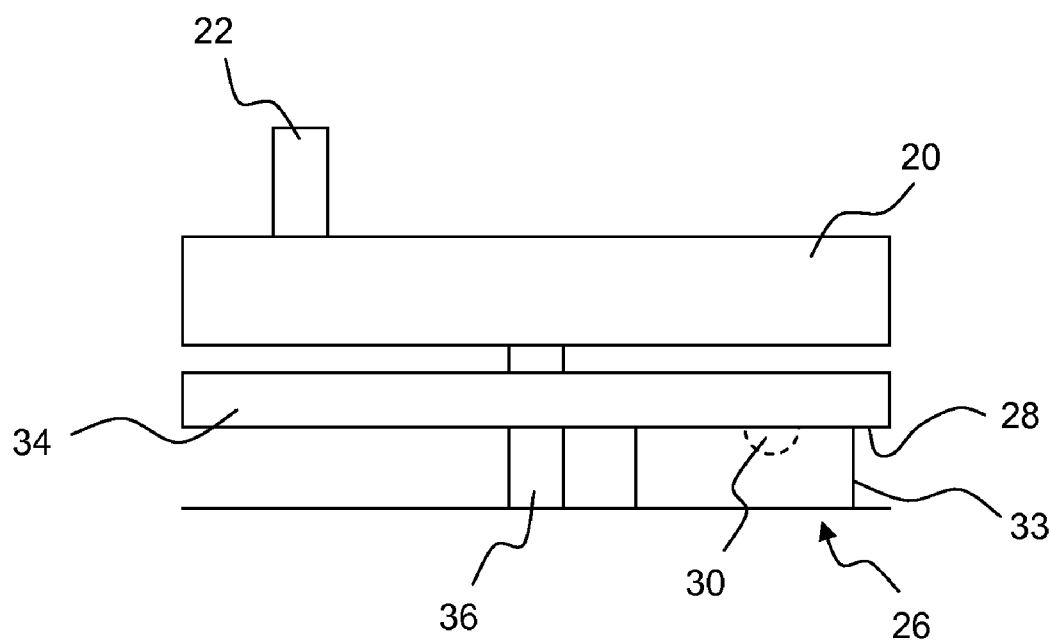
FIG. 3 is a view similar to FIG. 2 of the pointing device coupled to the hand wheel according to another embodiment of the present invention.

Referring to FIGS. 1-3, machine tool 10 further includes hand wheel 20. Hand wheel 20 may be rotated by a user. In operation, the user rotates hand wheel 20 to direct movable element 14 to move or to change the velocity of movable element 14. The user may manually direct movable element 14 to move or change velocity during set-up and positioning of machine tool 10 and/or during operation of machine tool 10. For example, during operation of machine tool 10 by a part program, the user may modify the velocity of movable element 14. Hand wheel 20 may include handle 22 to assist the user in gripping and rotating hand wheel 20. Hand wheel 20 may further include detent mechanism 24, illustrated in FIG. 2. Detent mechanism 24 is configured to hold the rotational position of hand wheel 20 in place, to provide tactile feedback to the user, and to provide consistent and repeatable rotational increments resulting in consistent and repeatable movements of movable element 14. Hand wheel 20 may also include markings to indicate its rotational position.

To communicate movement of hand wheel 20 to control system 18, pointing device 26 is provided, as illustrated in FIGS. 1-3. Pointing device 26 includes any device capable of tracking a moving surface, referred to herein as tracking surface 28, and communicating the tracked movement to control system 18. More specifically, pointing device 26 may include sensor 30 capable of tracking movement of tracking surface 28 and output 32 capable of communicating the tracked movement to control system 18. Tracking surface 28 need not include any special features for pointing device 26 to operate properly. For example, tracking surface 28 need not include patterns, slots, or holes. In fact, the Twin-Eye Laser Sensor available from Philips Electronics of the Netherlands may be capable of tracking a mirrored tracking surface 28. Pointing device 26 may further include enclosure 33 to surround, shield, and protect sensor 30.

In an exemplary embodiment of the present invention, pointing device 26 includes a computer mouse or the working components of a computer mouse. More specifically, pointing device 26 may include a roller-ball mouse, a track ball mouse, an optical mouse, a laser mouse, or any other type of computer mouse. Rather than moving pointing device 26 relative to a stationary tracking surface 28, such as a desk or mouse pad, tracking surface 28 itself may move relative to a stationary pointing device 26. Alternatively, pointing device 26 may function as it normally would by moving pointing device 26 relative to tracking surface 28.

Sensor 30 of pointing device 26 is capable of detecting motion of tracking surface 28 in at least one dimension. Sensor 30 may also be capable of both emitting and detecting signals, or a separate component may be provided for emitting signals that sensor 30 detects. For example, if pointing device 26 includes an optical computer mouse, pointing device 26 may include a light-emitting diode (LED) that emits light onto tracking surface 28, and sensor 30 may be capable of sensing light reflected by tracking surface 28. As another example, if pointing device 26 includes a laser computer mouse, pointing device 26 may include an infrared laser diode that emits light onto tracking surface 28, and sensor 30 may be capable of sensing light reflected by tracking surface 28. An exemplary sensor 30 is relatively tolerant of various physical arrangements of pointing device 26 and tracking surface 28, including variations in distance between the components. Further, the precision of an exemplary sensor 30 may be altered via a command from control system 18 to accommodate these various physical arrangements. For example, the sensitivity of sensor 30 may be altered to vary the apparent speed of tracking surface 28 without having to modify the physical arrangement itself.

Output 32 of pointing device 26 is capable of communicating with control system 18, such as a personal computer. For example, output 32 may include a universal serial bus (USB) connector, a PS/2 connector, a serial port connector, or another known connector. Control system 18 may include a port configured to receive output 32 of pointing device 26. For example, control system 18 may include a USB port, a PS/2 port, a serial port, or another suitable port.

Referring to FIGS. 2-3, to track movement of hand wheel 20, pointing device 26 is coupled to hand wheel 20 such that pointing device 26 tracks movement of rotating hand wheel 20. In one embodiment of the present invention, illustrated in FIG. 2, pointing device 26 is coupled to hand wheel 20 such that tracking surface 28 is a surface of hand wheel 20 itself. More specifically, tracking surface 28 is the bottom surface of hand wheel 20. In another embodiment of the present invention, illustrated in FIG. 3, hand wheel 20 is coupled to disc 34, which is in turn coupled to hand wheel 20 to rotate with hand wheel 20, such that tracking surface 28 is a surface of disc 34. More specifically, tracking surface 28 is the bottom surface of disc 34. As shown, both hand wheel 20 and disc 34 are mounted to rotating shaft 36 to rotate therewith.

As mentioned above, pointing device 26 may include enclosure 33 to surround, shield, and protect sensor 30. For example, enclosure 33 may be used to prevent stray electromagnetic interference from disrupting operation of sensor 30. In one form of the present invention, both pointing device 26 and tracking surface 28 are located within enclosure 33. In another form of the present invention, pointing device 26 and tracking surface 28 are located within separate enclosures, especially when less-stringent optical tolerances are necessary. In other words, pointing device 26 may be located within enclosure 33, while tracking surface 28 may be located within a separate enclosure. Each separate enclosure may have a unique ingress protection (IP)/NEMA rating. In yet another form of the present invention, illustrated in FIGS. 2-3, tracking surface 28 need not be enclosed. The enclosures described herein may be transparent or opaque.

Figure 4:
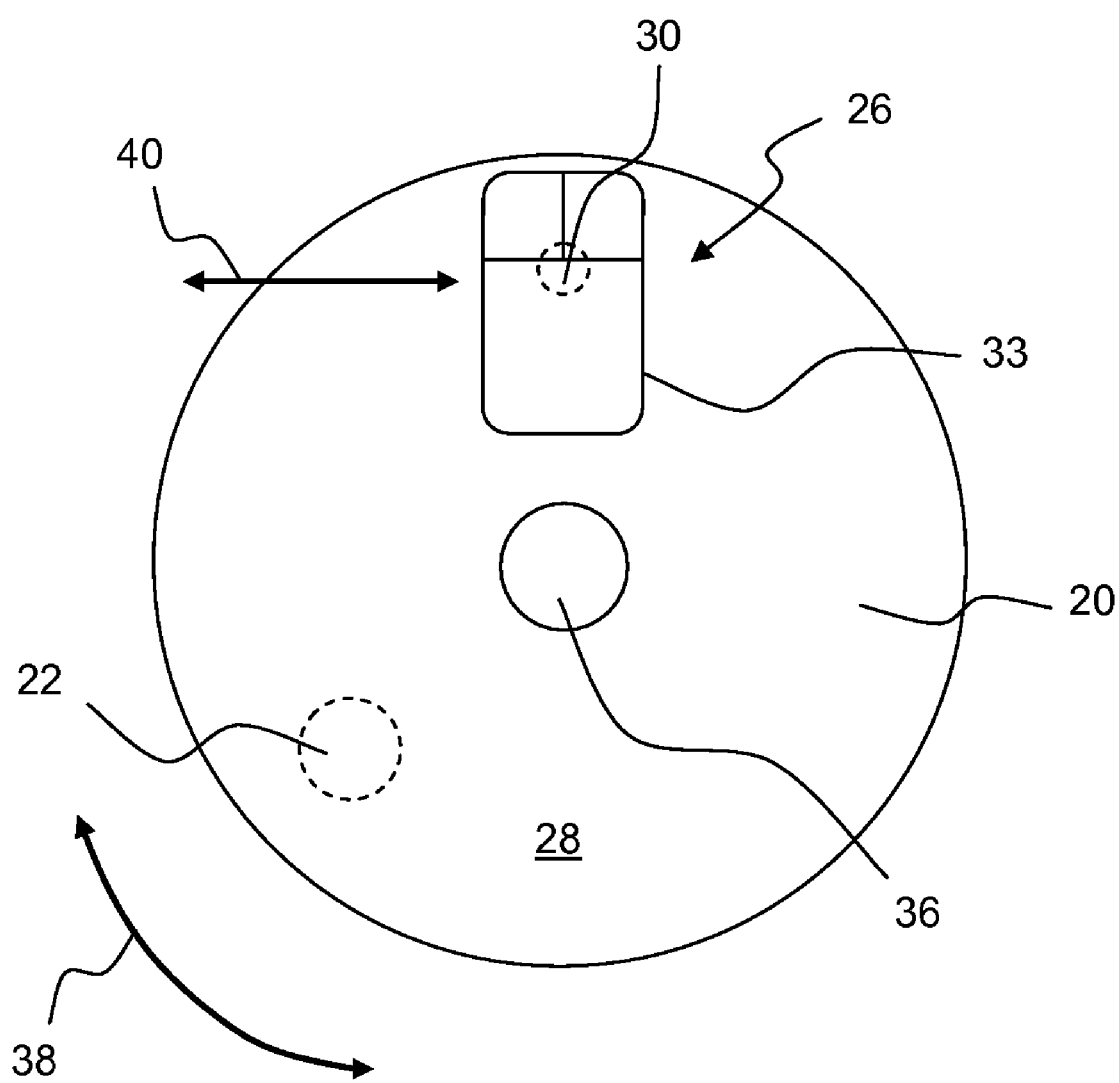
FIG. 4 is a bottom plan view of the pointing device coupled to the hand wheel according to an embodiment of the present invention.

Referring to FIG. 4, pointing device 26 may be configured to track movement of tracking surface 28 in one dimension. As hand wheel 20 or disc 34 coupled thereto (FIG. 3) rotates in the direction illustrated schematically by arrow 38, pointing device 26 remains stationary relative to hand wheel 20 or disc 34 coupled thereto (FIG. 3). In this position, pointing device 26 tracks movement of tracking surface 28 along a single axis, illustrated schematically as X axis 40. If pointing device 26 is capable of tracking movement in more than one dimension, control system 18 may be configured to receive inputs relating to the one dimension and to ignore inputs relating to other dimensions.

Figure 5:
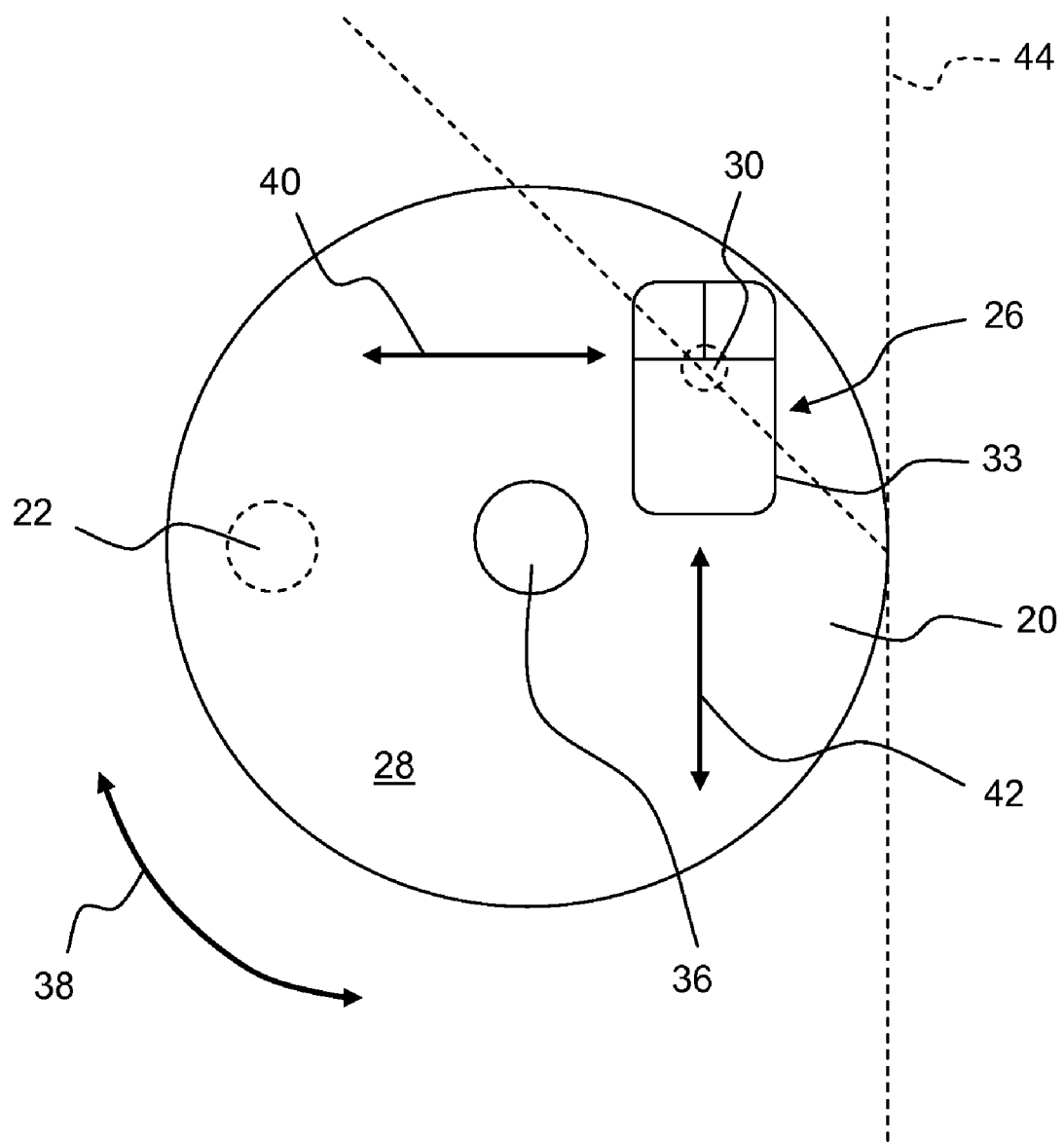
FIG. 5 is a view similar to FIG. 4 of the pointing device coupled to the hand wheel according to another embodiment of the present invention.

Referring to FIG. 5, pointing device 26 may track movement of tracking surface 28 in more than one dimension. As hand wheel 20 or disc 34 coupled thereto (FIG. 3) rotates in the direction illustrated schematically by arrow 38, pointing device 26 remains stationary relative to hand wheel 20 or disc 34 coupled thereto (FIG. 3). In this position, pointing device 26 tracks movement of tracking surface 28 along multiple axes, illustrated schematically as X axis 40 and Y axis 42. In an exemplary embodiment, sensor 30 of pointing device 26 may be oriented 45 degrees from tangent 44. In this position, the movement of tracking surface 28 along X axis 40 is equivalent to the movement of tracking surface 28 along Y axis 42. Pointing device 26 may track movement of tracking surface 28 along both X axis 40 and Y axis 42 for redundancy, to assist in determining if sensor 30 is reporting false movement. Also, pointing device 26 may track movement of tracking surface 28 along both X axis 40 and Y axis 42 while providing separate configurations for each dimension. Each dimension of pointing device 26 may be independently programmed to track tracking surface 28 with unique speed sensitivity, resolution, laser intensity, and/or surface conditions. For example, pointing device 26 may be programmed to track movement of tracking surface 28 along X axis 40 with a low speed sensitivity to allow the system to reject slight, unintended movements of hand wheel 20, such as movements caused by vibration or minor bumping. At the same time, pointing device 26 may be programmed to track movement of tracking surface 28 along Y axis 42 with a high speed sensitivity to allow the system to respond to intentional movements of hand wheel 20.

Figure 6:
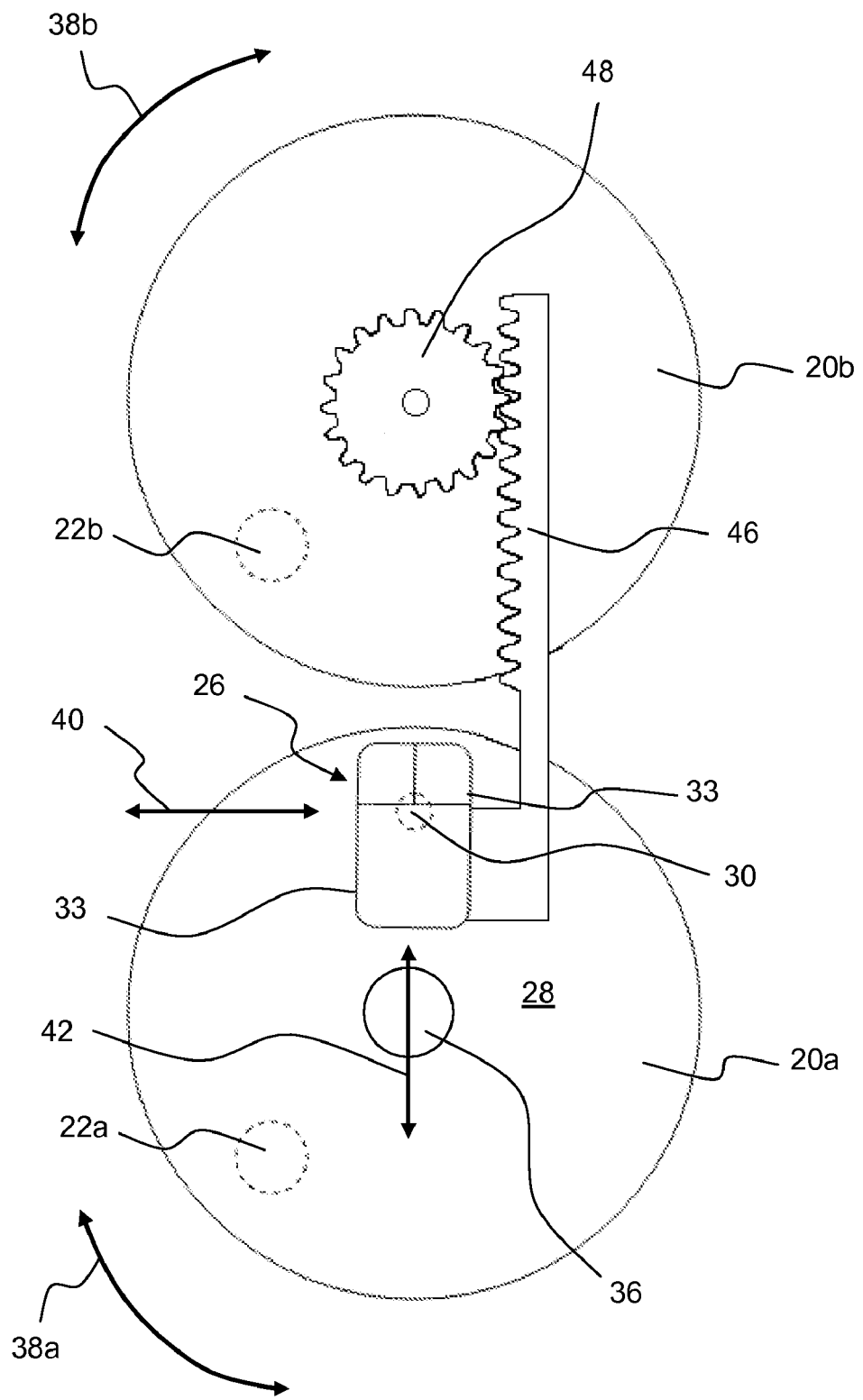
FIG. 6 is a view similar to FIG. 4 of the pointing device coupled to multiple hand wheels according to an embodiment of the present invention.

Referring to FIG. 6, pointing device 26 may track the movement of more than one hand wheel, referred to herein as first hand wheel 20a and second hand wheel 20b. As first hand wheel 20a rotates in the direction illustrated schematically by first arrow 38a, pointing device 26 tracks movement of tracking surface 28 along X axis 40. In the illustrated arrangement, tracking surface 28 of first hand wheel 20a is essentially stationary along Y axis 42 with essentially all of the rotational movement occurring along X axis 40. To this point, pointing device 26 of FIG. 6 performs essentially the same as pointing device 26 of FIG. 4. Second hand wheel 20b may also be provided. Rather than remaining stationary relative to first hand wheel 20a, pointing device 26 moves radially relative to first hand wheel 20a. As shown, pointing device 26 is coupled to second hand wheel 20b. More specifically, pointing device 26 is coupled to rack 46 that interacts with gear or pinion 48 coupled to second hand wheel 20b. The illustrated embodiment is not intended to limit the scope of the present invention as pointing device 26 may be coupled to second hand wheel 20b in other ways, such as with a worm gear or a pulley system. As second hand wheel 20b rotates in the direction illustrated schematically by second arrow 38b, pointing device 26 travels over tracking surface 28 along Y axis 42 and tracks its movement over tracking surface 28. As mentioned above, tracking surface 28 of first hand wheel 20a is essentially stationary along Y axis 42, such that the tracked movement along Y axis 42 may be attributed to second hand wheel 20b. As mentioned above, pointing device 26 may be programmed with separate configurations in each dimension to track first hand wheel 20a and second hand wheel 20b with, for example, unique speed sensitivity, resolution, laser intensity, and/or surface conditions. For example, pointing device 26 may be programmed to track movement of tracking surface 28 along X axis 40 with a low speed sensitivity to allow the system to reject slight, unintended movements of first hand wheel 20a, such as movements caused by vibration or minor bumping. At the same time, pointing device 26 may be programmed to track movement of tracking surface 28 along Y axis 42 with a high speed sensitivity to allow the system to respond to intentional movements of second hand wheel 20b. In an alternative embodiment of the present invention, both first hand wheel 20a and second hand wheel 20b may be provided with separate pointing devices 26.

Referring again to FIG. 1, pointing device 26 is capable of communicating the tracked movement of tracking surface 28 to control system 18. In an exemplary embodiment of the present invention, output 32 of pointing device 26 may communicate incremental plus (+)/minus (−) signals, or data packets containing that information, to control system 18. For example, as shown in FIG. 4, as hand wheel 20 rotates in a clockwise direction, sensor 30 of pointing device 26 tracks rightward movement of tracking surface 28 along X axis 40 and communicates corresponding plus (+) signals to a CPU within pointing device 26. The number of plus (+) signals communicated to the CPU indicates the distance tracked by pointing device 26. In other words, sensor 30 will send more plus (+) signals to the CPU when the user rotates hand wheel 20 quickly than when the user rotates hand wheel 20 slowly. Over an allotted time increment (e.g. 0.005-0.01 second), the CPU of pointing device 26 will count the signals and convert the signals to a data packet indicating the distance tracked over the allotted time increment. Output 32 of pointing device 26 will incrementally communicate data packets to control system 18. Similarly, as hand wheel 20 rotates in a counter-clockwise direction, sensor 30 of pointing device 26 tracks leftward movement of tracking surface 28 along X axis 40 and communicates corresponding minus (−) signals to the CPU of pointing device 26. The CPU then communicates data packets indicating the tracked distance to control system 18. It is also within the scope of the present invention that rightward movement of tracking surface 28 along X axis 40 may generate a minus (−) signal rather than a plus (+) signal and that leftward movement of tracking surface 28 along X axis 40 may generate a plus (+) signal rather than a minus (−) signal.

Referring still to FIG. 1, control system 18 is configured to receive communications from pointing device 26. As described above, control system 18 may receive incremental data packets indicating the tracked distance from output 32 of pointing device 26. These data packets may be associated with an electronic signature that directs the data packets to, for example, a CNC software program, rather than to an icon on a screen in a conventional manner. In this manner, control system 18 may include a separate computer mouse that controls the screen icon in the conventional manner. In operation, control system 18 interprets the data packets and then directs movement of movable element 14 accordingly. Returning to the previous example illustrated in FIG. 4, if a user rotates hand wheel 20 in a clockwise direction, sensor 30 of pointing device 26 communicates plus (+) signals to the CPU within pointing device 26, and then the CPU communicates data packets indicating the tracked distance to control system 18. Upon receiving these data packets, control system 18 directs movable element 14, such as cutting tool 12, tool magazine 13, or workpiece table 16, to move or to change velocity. For example, control system 18 may direct cutting tool 12 upward (Z direction) relative to the workpiece. The resulting motion of movable element 14 may correspond to the distance and/or speed at which the user rotated hand wheel 20.

In addition to determining incremental rotational movement of hand wheel 20, control system 18 may determine and store the absolute rotational position of hand wheel 20. The absolute rotational position of hand wheel 20 may be stored in non-volatile memory of control system 18, such that the absolute rotational position is reset when control system 18 is restarted. The absolute rotational position of hand wheel 20 may also be displayed for the user. For example, the absolute rotational position of hand wheel 20 may be displayed digitally on hand wheel 20 or on a nearby computer screen of control system 18.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A machine tool comprising:
   at least one movable element;
   a control system;
   a rotatable first hand wheel having a tracking surface with at least one physically consistent region;
   a second hand wheel having a different axis of rotation than the first hand wheel; and
   a pointing device coupled to both the first hand wheel and the second hand wheel configured to track movement of both the first and second hand wheels, the pointing device being configured to interact with the at least one physically consistent region of the tracking surface to track movement of the first hand wheel as the tracking surface translates across the pointing device and to communicate the movement to the control system, the control system being configured to control the at least one movable element based upon the movement of the first hand wheel.

2. The machine tool of claim 1, wherein the pointing device comprises at least a sensor of a computer mouse.

3. The machine tool of claim 1, wherein the at least one movable element comprises one of a cutting tool, a tool magazine, and a workpiece positioning mechanism.

4. The machine tool of claim 1, wherein the pointing device includes at least one of a USB output, a PS/2 output, and a serial port output configured to communicate with the control system.

5. The machine tool of claim 1, wherein the at least one physically consistent region of the tracking surface is consistent in elevation and in pattern.

6. The machine tool of claim 1, wherein the tracking surface is formed either integrally on the first hand wheel or defined by component that is coupled to the first hand wheel for rotation therewith.

7. The machine tool of claim 1, wherein the pointing device tracks movement of the first hand wheel along a first axis and tracks movement of the second hand wheel along a second axis that is perpendicular to the first axis.

8. The machine tool of claim 1, wherein rotation of the second hand wheel moves the pointing device radially relative to the first and second hand wheels.

9. A machine tool comprising:
   at least one movable element;
   a control system;
   a first rotatable hand wheel having a tracking surface;
   a second hand wheel having a different axis of rotation than the first hand wheel; and
   a pointing device that directly contacts the tracking surface of the first hand wheel, the pointing device coupled to both the first hand wheel and the second hand wheel and being configured to track a movement of the first and second hand wheels as the tracking surface translates across the pointing device and to communicate the movement to the control system, the control system being configured to control the at least one movable element based upon the movement of the hand wheels.

10. The device of claim 9, wherein the tracking surface is defined by a component that is coupled to the hand wheel for rotation therewith.

11. The device of claim 9, wherein the pointing device remains stationary while the tracking surface translates across the pointing device.

* * * * *